(12) United States Patent
Danguy et al.

(10) Patent No.: US 10,167,874 B2
(45) Date of Patent: Jan. 1, 2019

(54) CENTRIFUGAL PUMP, IN PARTICULAR FOR SUPPLYING POWER TO ROCKET ENGINES

(71) Applicant: SNECMA, Paris (FR)

(72) Inventors: François Danguy, Tourny (FR); Jean-Michel Nguyen Duc, Vezillon (FR); Laurent Fabbri, Gasny (FR); Cëdric Sene, Rouen (FR)

(73) Assignee: Arianegroup SAS, Paris (FR)

( * ) Notice: Subject to any disclaimer, the term of this patent is extended or adjusted under 35 U.S.C. 154(b) by 322 days.

(21) Appl. No.: 14/906,712

(22) PCT Filed: Jul. 11, 2014

(86) PCT No.: PCT/FR2014/051799
§ 371 (c)(1),
(2) Date: Jan. 21, 2016

(87) PCT Pub. No.: WO2015/011366
PCT Pub. Date: Jan. 29, 2015

(65) Prior Publication Data
US 2016/0177963 A1    Jun. 23, 2016

(30) Foreign Application Priority Data

Jul. 22, 2013    (FR) .................................. 13 57205

(51) Int. Cl.
*F04D 29/08* (2006.01)
*F02K 9/48* (2006.01)
(Continued)

(52) U.S. Cl.
CPC .............. *F04D 29/086* (2013.01); *F01D 3/04* (2013.01); *F01D 5/02* (2013.01); *F01D 25/16* (2013.01);
(Continued)

(58) Field of Classification Search
CPC .......... F01D 3/04; F01D 25/183; F04D 29/08; F04D 29/086; F04D 7/02; F04D 13/043; F02K 9/46; F02K 9/48; F05D 2220/80
See application file for complete search history.

(56) References Cited

U.S. PATENT DOCUMENTS

| 2,698,584 A | 1/1955 | Stelzer |
| 3,395,645 A * | 8/1968 | Vilet ..................... F04D 29/146 277/387 |

(Continued)

FOREIGN PATENT DOCUMENTS

| DE | 652168 C | 10/1937 |
| EP | 0 410 948 A2 | 1/1991 |

(Continued)

OTHER PUBLICATIONS

English Translation of Search Report dated Jan. 30, 2015, in corresponding International PCT Application No. PCT/FR2014/051799, filed on Jul. 11, 2014 (3 pages).

(Continued)

*Primary Examiner* — Logan Kraft
*Assistant Examiner* — Elton Wong
(74) *Attorney, Agent, or Firm* — Bookoff McAndrews, PLLC (57) ABSTRACT

The invention relates to the field of centrifugal pumps, and in particular it relates to a centrifugal pump (303, 403) comprising at least: an impeller (303a, 403a); a rotary shaft (302, 402) secured to said impeller (303a, 403a); a casing (320, 420) having an axial admission passage (325, 425); at least one first bearing (305, 405) supporting said rotary shaft (302, 402) in said casing (320, 420); and at least one dynamic seal (311, 411) around the rotary shaft (302, 402), the impeller (303a, 403a) being situated between the at least one dynamic seal (311, 411) and the axial admission passage (325, 425) of the pump (303, 403). The centrifugal pump (Continued)

(303, 403) also comprises, between the impeller (303a, 403a) and at least one dynamic seal (311, 411), an axial force compensation disk (330, 430) secured to the shaft (302, 402) and presenting a diameter greater than 70% of a diameter of the impeller (303a, 403a). A front face (330a, 430a) of the disk (330, 430) faces towards the impeller (303a, 403a) and is connected to a branch connection for fluid under pressure taken downstream from the pump (303, 403), and a rear face (330b, 430b) faces towards the dynamic seals (311, 411) and presents fins (330c, 430c) that are oriented radially, at least in part.

9 Claims, 5 Drawing Sheets (51) Int. Cl.
| | | |
|---|---|---|
| F01D 25/18 | (2006.01) | |
| F01D 25/16 | (2006.01) | |
| F01D 3/04 | (2006.01) | |
| F04D 29/22 | (2006.01) | |
| F04D 29/043 | (2006.01) | |
| F04D 29/046 | (2006.01) | |
| F04D 1/00 | (2006.01) | |
| F04D 29/42 | (2006.01) | |
| F01D 5/02 | (2006.01) | |
| F02K 9/46 | (2006.01) | |
| F04D 7/02 | (2006.01) | |
| F04D 13/04 | (2006.01) | |
| F04D 29/041 | (2006.01) | |
| F04D 29/10 | (2006.01) | |

(52) U.S. Cl.
CPC .............. *F01D 25/183* (2013.01); *F02K 9/46* (2013.01); *F02K 9/48* (2013.01); *F04D 1/00* (2013.01); *F04D 7/02* (2013.01); *F04D 13/043* (2013.01); *F04D 29/043* (2013.01); *F04D 29/046* (2013.01); *F04D 29/0413* (2013.01); *F04D 29/108* (2013.01); *F04D 29/22* (2013.01); *F04D 29/426* (2013.01); *F05D 2220/80* (2013.01); *F05D 2240/53* (2013.01)

(56) References Cited

U.S. PATENT DOCUMENTS

| 3,589,827 | A | 6/1971 | Gerasimenko et al. |
| 5,529,464 | A | 6/1996 | Emerson et al. |
| 7,435,277 | B2 * | 10/2008 | Raussi ............... B01D 19/0052 55/406 |
| 2013/0227931 | A1 * | 9/2013 | Danguy ................ F02K 9/46 60/246 |

FOREIGN PATENT DOCUMENTS

| FR | 2 964 425 | A1 | 3/2012 | |
| FR | 2964425 | A1 * | 3/2012 | ............... F02K 9/46 |

OTHER PUBLICATIONS

Notification according to Article 94(3) of the EPC dated Aug. 24, 2017, in corresponding European Patent Application No. 14790135.9 (6 pages).

* cited by examiner

FIG.1

Prior Art

FIG.2

Prior Art

CENTRIFUGAL PUMP, IN PARTICULAR FOR SUPPLYING POWER TO ROCKET ENGINES

CROSS-REFERENCE TO RELATED APPLICATIONS

This application is the U.S. national phase entry under 35 U.S.C. § 371 of International PCT Application No. PCT/FR2014/051799, filed on Jul. 11, 2014, which claims priority to French Patent Application No. FR 1357205, filed on Jul. 22, 2013, the entireties of each of which are incorporated by reference herein.

BACKGROUND OF THE INVENTION

The present invention relates to centrifugal pumps, and in particular to centrifugal pumps for feeding thrust chambers of rocket engines with reducer and/or oxidizer propellants, and more particularly with cryogenic propellants.

Examples of centrifugal pumps for feeding propellants to combustion chambers of a rocket engine are disclosed in French patent application FR 2 964 425 A1. Each of those prior art centrifugal pumps has an impeller, a rotary shaft secured to said impeller, a casing with an axial admission passage, and at least one bearing supporting said rotary shaft in said casing. In order to avoid leaks in an axial direction between the casing and the rotary shaft, those centrifugal pumps also include at least one dynamic seal around the rotary shaft, the impeller being situated between the at least one dynamic seal and the axial admission passage.

Typically, during the operation of such a centrifugal pump, its impeller exerts a large axial force on the rotary shaft towards the axial admission passage of the pump. In order to enable these forces to be taken up by the bearing(s) supporting the rotary shaft, one solution that has been proposed for other prior art pumps is the solution of incorporating at least one active balancing piston with the back of the impeller. Nevertheless, such a piston has the drawback of presenting considerable bulk. On the other hand, if the bearings are dimensioned so as to be capable on their own of taking up such a considerable force, that can only be done to the detriment of the compactness of the overall assembly. In addition, taking up axial forces through bearings in that way can dissipate a large amount of power.

Another solution that has been envisaged for compensating the axial force on the impeller is to add a plate to the tips of the blades of the impeller of the centrifugal pump. Nevertheless, that solution is difficult to implement, in particular on impellers of small size.

OBJECT AND SUMMARY OF THE INVENTION

The present invention seeks to remedy those drawbacks in particular, with this disclosure seeking to propose a centrifugal pump that makes it possible to obtain small bulk in spite of taking up the axial forces of the impeller.

In at least one embodiment, the centrifugal pump comprises at least: an impeller; a rotary shaft secured to said impeller; a casing having an axial admission passage; at least one first bearing supporting said rotary shaft in said casing; and at least one dynamic seal around the rotary shaft; said impeller being situated between the at least one dynamic seal and the axial admission passage of the pump.

Axial forces can then be taken up, without significantly increasing the overall bulk of the centrifugal pump, by means of an axial force compensation disk secured to the shaft, and presenting a diameter greater than 70% of a diameter of the impeller. The compensation disk is situated between the impeller and the dynamic seal with a front face facing towards the impeller and connected to a branch connection for fluid under pressure taken downstream from the pump, and a rear face facing towards at least one dynamic seal and presenting fins that are oriented radially, at least in part. The term "radially, at least in part" means that this orientation presents at least a radial component. When the disk rotates with the rotary shaft and the impeller of the pump, these fins of the disk thus act by means of the centrifugal effect to generate a drop in pressure from the periphery of the disk to the at least one dynamic seal, thereby limiting leaks of pressurized fluid towards the dynamic seal, while ensuring that the pressure against the first face of the disk is greater than the pressure against its second face, this pressure difference serving to compensate the axial force transmitted to the shaft by the impeller.

In order to optimize the distribution of the material of the radial force compensation disk so as to reduce its weight while ensuring that it can withstand centrifugal forces, said axial force compensation disk may taper towards a periphery of the disk. This tapering thickness can be obtained by the front face and/or the rear face sloping relative to a radial plane.

Said first bearing may in particular be situated between the impeller and the axial force compensation disk, so as to facilitate lubricating the first bearing with the pressurized fluid acting against the front face of the axial force compensation disk, thus enabling an arrangement to be maintained for the centrifugal pump that is comparatively simple, that is reliable, and that presents little weight and small bulk.

For the same reason, said first bearing may also be connected to a branch connection for fluid under pressure taken downstream from the impeller for lubricating the first bearing with the fluid coming from the pump. This branch connection may be the connection used for feeding the axial force compensation disk, or it may be a different connection. In addition, said centrifugal pump may include an auxiliary pump, that is preferably driven by the rotary shaft of the centrifugal pump, for the purpose of discharging said fluid from the first bearing. In particular, the auxiliary pump may be in the form of a backpump having blades formed on a rear face of the impeller of the centrifugal pump. This makes it possible to direct the discharge of the fluid, in particular to return it to a main stream from the pump.

Even without fins, the rotation of the front face of the disk entrains a portion of the pressurized fluid towards the periphery of the disk. With fluids of high density, it is important to limit the increase in the static pressure against the front face going towards the periphery of the disk. In order to limit this increase in pressure, the pump may further comprise, facing the front face of the axial force compensation disk, fins that are secured to the casing and that have an orientation that is radial, at least in part, thereby serving to impede rotation of the fluid with the front face of the disk. Nevertheless, and alternatively, in particular for low density fluids, such as liquid hydrogen, for which the increase in static pressure is comparatively small, it is possible to omit such static fins facing the front face of the disk.

Said first bearing may in particular be a ball bearing, thus providing very low resistance to rotation of the shaft, even at very high speeds of rotation.

The centrifugal pump may in particular be configured to pump a fluid that is a cryogenic fluid and/or a propellant. The compactness and the light weight of the centrifugal pump are particularly useful in a system for feeding liquid propellants.

The at least one dynamic seal may in particular be connected to a source of inert fluid so as to create a fluid barrier around the rotary shaft. Such a fluid barrier makes it possible to obtain a particularly high degree of sealing.

The present disclosure also provides a turbopump comprising the above-mentioned centrifugal pump and a turbine, in particular an axial turbine, with a turbine wheel secured to the rotary shaft of the centrifugal pump, at least one dynamic seal being interposed between the axial force compensation disk and said turbine wheel. A turbine constitutes centrifugal pump drive means that are compact and lightweight. Simultaneously, because of the dynamic seal and of the axial force compensation disk, it is possible to keep the working fluids of the pump and the turbine separate.

This sealing between the fluid propelling the turbine and the fluid pumped by the pump is particularly important when this gas and this fluid are chemically reactive with each other. In particular, in turbopumps for feeding propellant to rocket engines, the propulsion gas for the turbine is normally a reducer, which generally requires absolute sealing in oxidizer turbopumps in order to ensure that the oxidizer fluid being pumped is kept separate from the reducer gas propelling the turbine.

The invention also provides a rocket engine having at least one turbopump of the invention for feeding at least one thrust chamber of said rocket engine with at least one propellant, e.g. a reducer fluid and/or an oxidizer fluid.

Because of the compactness, the light weight, the reliability, and the simplicity of the turbopump of the invention, it is particularly advantageous for application to rocket engines, and in particular very low thrust rocket engines, and rocket engines using cryogenic propellants.

BRIEF DESCRIPTION OF THE DRAWINGS

The invention can be well understood and its advantages appear more clearly on reading the following detailed description of embodiments given as non-limiting examples. The description refers to the accompanying drawings, in which.

DETAILED DESCRIPTION OF THE INVENTION

Figure 1:
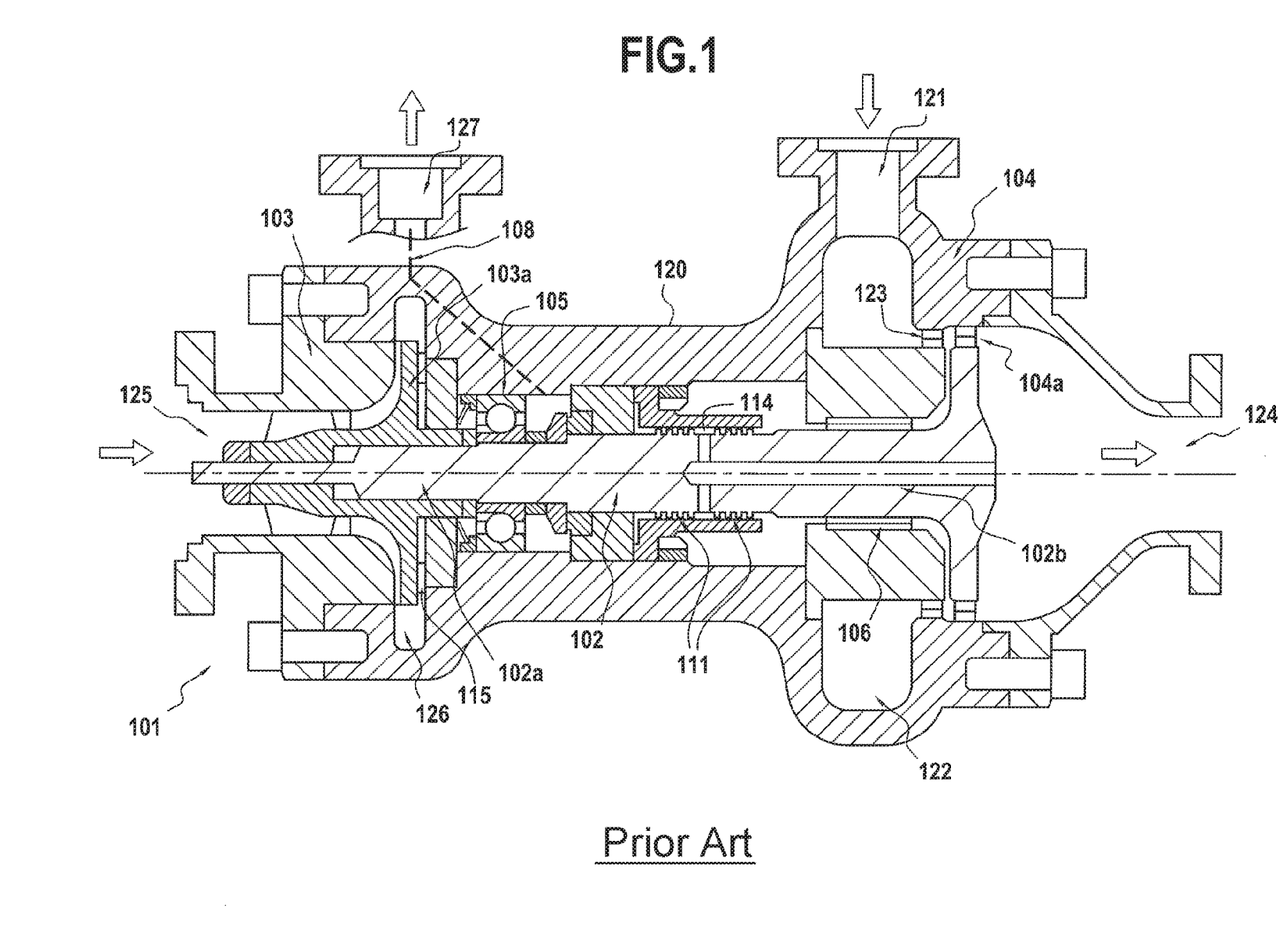
FIG. 1 is a longitudinal section view of a prior art turbopump for feeding a rocket engine combustion chamber with liquid cryogenic reducer propellant.
Figure 2:
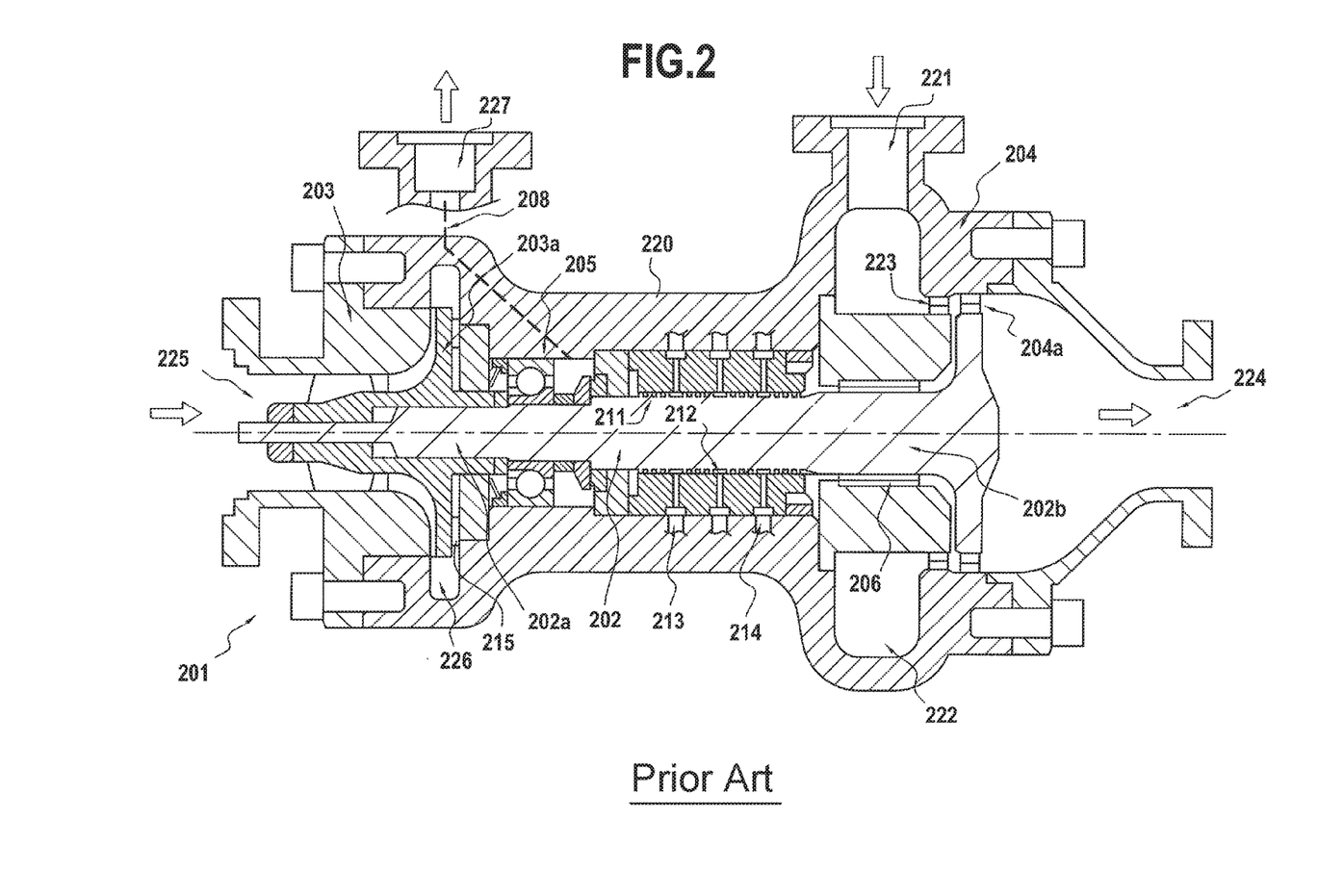
FIG. 2 is a longitudinal section view of a prior art turbopump for feeding a rocket engine combustion chamber with liquid cryogenic oxidizer propellant.

In order to better understand the invention, the description begins with two prior art turbopumps 101 and 201 shown in FIGS. 1 and 2 and corresponding to the turbopumps disclosed in French patent application FR 2 964 425 A1. In the casing 120 of the turbopump 101 for reducer propellant that is shown in FIG. 1, a rotary shaft 102 connects the impeller 103a of the centrifugal pump 103 to the wheel 104a of the axial turbine 104. A first end 102a of the shaft 102 is secured to the impeller 103a of the pump 103, and a second end 102b of the shaft 102, opposite from said first end 102a, is secured to the wheel 104a of the turbine 104. Around the turbine 104, the casing 120 presents a radial admission duct 121, an admission torus 122, a nozzle 123, and an axial exhaust duct 124. Around the pump 103, the casing 120 presents an axial admission passage 125, a volute 126, and an exhaust tube 127. Thus, rotation of the rotor 104a of the turbine 104 under propulsion from expansion of the gas entering the turbine 104 via the radial admission duct 121, the admission torus 122, and the nozzle 123, and leaving via the axial exhaust duct 124, serves to drive rotation of the shaft 102 and the impeller 103a of the centrifugal pump 103. The reducer propellant, driven by the impeller 103a, enters into the pump 103 via the axial admission passage 125 and leaves via the volute 126 and the exhaust tube 127.

The shaft 102 is supported in the casing 120 by first and second bearings 105 and 106. The first bearing 105 is a ball bearing lubricated by a small flow 108 of liquid propellant under pressure taken from the exhaust tube 127. This fluid is then discharged to the volute 126 by a backpump 115 having blades formed on a rear face of the rotor 103a of the pump 103. The second bearing 106, supporting the second end 102b of the shaft 102 in the proximity of the turbine 104, is a hydrodynamic bearing in which a thin stream of gas for propelling the turbine 104 and taken from its admission torus 122, prevents direct contact between facing solid surfaces. Alternatively, this gas feeding the second bearing 106 could be taken from somewhere else, e.g. from the outlet of a regenerative circuit of a thrust chamber, if the temperature of the turbine propulsion gas is too high.

In order to separate the gas of the hydrodynamic bearing 106 from the liquid of the ball bearing 105, while the pump 101 is in operation, the turbopump 101 has dynamic seals 111 around the shaft 102 between the ball bearing 105 and the hydrodynamic bearing 106, with a purge point 114 leading to the axial exhaust duct 124.

The oxidizer propellant turbopump 201 shown in FIG. 2 also has a rotary shaft 202 connecting the impeller 203a of the centrifugal pump 203 to the wheel 204a of the axial turbine 204. As in the turbopump 101, a first end 202a of the shaft 202 is secured to the impeller 203a of the pump 203, and a second end 202b of the shaft 202, opposite from said first end 202a, is secured to the wheel 204a of the turbine 204.

In the turbopump 201, the casing 220 likewise presents around the turbine 204, a radial admission duct 221, an admission torus 222, a nozzle 223, and an axial exhaust duct 224, and around the pump 203, an axial admission passage 225, a volute 226, and an exhaust tube 227. The pump 203 and the turbine 204 operate in manners analogous to the pump and the turbine in the turbopump 101, and as in the turbopump 101, the shaft 202 is supported in the casing 220 by a first bearing 205, which is a ball bearing, and by a second bearing 206, which is a hydrodynamic bearing. The first bearing 205 is thus lubricated by a small flow 208 of liquid propellant under pressure taken from the volute 226 and is subsequently discharged to the volute 226 by a backpump 215 having blades formed on a rear face of the rotor 203a of the pump 203, while in the second bearing 206, a thin stream of propulsion gas for the turbine 204 and taken from its admission torus 222, likewise prevents direct contact between facing solid surfaces. Alternatively, this gas feeding the second bearing 206 could be taken from somewhere else, for example from the outlet of a regenerative circuit of a thrust chamber, if the temperature of the turbine propulsion gas is too high.

As in the reducer propellant turbopump 101, this oxidizer propellant turbopump 201 includes dynamic seals 211 around the shaft 202 between the ball bearing 205 and the hydrodynamic bearing 206. Nevertheless, in the oxidizer turbopump 201, it is even more important to avoid leaks of the propellant being pumped by the pump 203 going to the turbine 204, since the propulsion gas for the turbine 204 is normally a reducer and could react violently with the oxidizer propellant being pumped by the pump 203.

In order to avoid contact between the flow 208 of oxidizer fluid and the reducer fluid, the turbopump 201 also presents an injection point 202 for injecting an inert fluid, such as helium for example, and purge points 213 and 214, respectively for purging the oxidizer fluid and the reducer fluid, that are located on respective sides of the injection point 212. A fluid barrier is thus created between the oxidizer and reducer fluid.

While those prior art turbopumps 101 and 201 are in operation, the ball bearings 105 and 205 are subjected to very considerable axial loads. Unfortunately, that presents the drawback of dissipating a large amount of energy, thereby increasing the lubrication requirements of those bearings 105 and 205 and also decreasing the efficiency of the turbopump. Furthermore, overdimensioning the bearings 105 and 205 goes against the desire for turbopumps to be compact.

Figure 3:
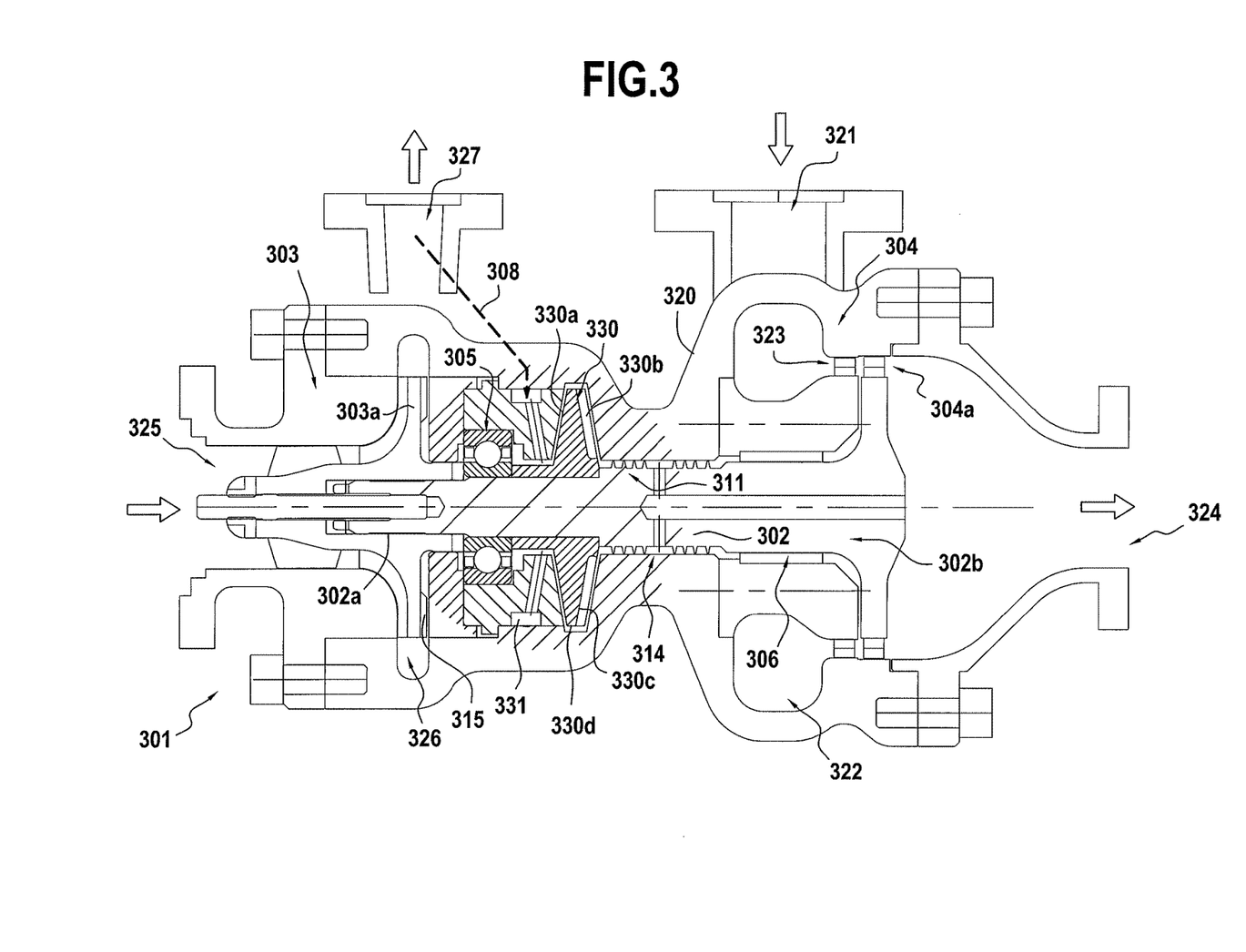
FIG. 3 is a section view of a turbopump in a first embodiment for feeding a rocket engine combustion chamber with liquid cryogenic reducer propellant.

In a first embodiment, as shown in FIG. 3, the turbopump 301, which is a reducer propellant turbopump, and more specifically may be a cryogenic turbopump for liquid hydrogen, also comprises, like the above turbopumps of the prior art, a centrifugal pump 303 and an axial turbine 304 with a common casing 320 and a common rotary shaft 302 connecting together the impeller 303a of the centrifugal pump 303 and the wheel 304a of the axial turbine 304. A first end 302a of the shaft 302 is secured to the impeller 303a, and a second end 302b of the shaft 302, opposite from said first end 302a, is secured to the wheel 304a. The impeller 303a presents a diameter $d_r$.

The casing 320 also presents, around the turbine 304, a radial admission duct 321, an admission torus 322, a nozzle 323, and an axial exhaust duct 324, and around the pump 303, an axial admission passage 325, a volute 326, and an exhaust tube 327. As in the above-described examples, the shaft 302 is supported in the casing 320 by a first bearing 305, which is a ball bearing, and a second bearing 306, which is a hydrodynamic bearing through which a thin stream of propulsion gas for the turbine 304 and taken from its admission torus 322 serves to prevent direct contact between facing solid surfaces. Nevertheless, as an alternative, other types of bearing could be envisaged for one or both of the bearings. The first bearing 305 is closer to the impeller 303a of the pump 303, while the second bearing 306 is closer to the wheel 304a of the turbine 304.

Although, in the embodiment shown, the gas for the hydrodynamic bearing 306 is taken from the admission torus 322, it could alternatively be taken from some other point, for example if the temperature of the gas propelling the turbine is too high, it could be taken from the outlet of a regenerative circuit of a thrust chamber.

Dynamic seals 311 around the shaft 302, situated between the first bearing 305 and the second bearing 306, and presenting a purge point 314 leading to the axial exhaust duct 324 serve to separate the pump 303 from the turbine 304. In the embodiment shown, these seals 311 are labyrinth seals. Nevertheless, other types of seal could equally well be envisaged, such as for example: floating ring seals, segmented seals, or brush seals.

The pump 303 and the turbine 304 operate in analogous manner to the pumps and the turbines of the prior art turbopumps 101 and 201. Nevertheless, in this turbopump 301, the pump 301 also includes, between the dynamic seal 311 and the first bearing 305, a disk 330 that is secured to the rotary shaft 302 for the purpose of compensating the axial forces exerted by the impeller 303a of the pump and the wheel 304 of the turbine on the rotary shaft 302. Thus, the disk 330 presents a front face 330a that is substantially smooth facing the first bearing 305, and a rear face 330b facing the dynamic seals 311 that presents radial fins 330c. The periphery 330d of the disk 330 presents a diameter $d_d$ that may for example lie in the range 70% to 100% of the diameter $d_r$ of the impeller 303a. The casing 320 presents a passage 331 that is connected to the exhaust tube 327 and that opens out between the first bearing 305 and the front face 330a of the disk 330. In order to limit the weight of the disk 330, while ensuring that it is strong enough to withstand centrifugal forces, its thickness tapers towards the periphery 330d, the front and rear faces 330a and 330b being substantially frustoconical in shape.

In operation, a flow 308 of liquid propellant under pressure is thus taken from the exhaust tube 327 and is reinjected between the first bearing 305 and the front face 330a of the disk 330. A fraction of this flow 308 serves to lubricate the first bearing 305 and is then discharged to the volute 326 by a backpump 315 having blades formed on a rear face of the impeller 303a of the pump 303. The remainder of the flow 308 nevertheless flows around the disk 330. On its front face 330a, the fluid exerts a considerable amount of pressure towards the turbine 304. However, on the rear face 330b, the rotating fins 330c significantly decrease the pressure that the fluid exerts in the opposite direction. Thus, the pressure difference between the two faces 330a and 330b urges the disk 330 towards the turbine 304, thereby compensating at least in part the traction that is exerted by the impeller 303a on the shaft 302. After going round the disk 330, the fluid is sucked towards the purge point 314, and in the proximity thereof its pressure drops below its vaporization point, thereby producing a vapor lock that reinforces the sealing between the pump 303 and the turbine 304.

Thus, the disk 330 contributes simultaneously to compensating the axial forces on the shaft 302 and to providing sealing between the pump 303 and the turbine 304.

Figure 4:
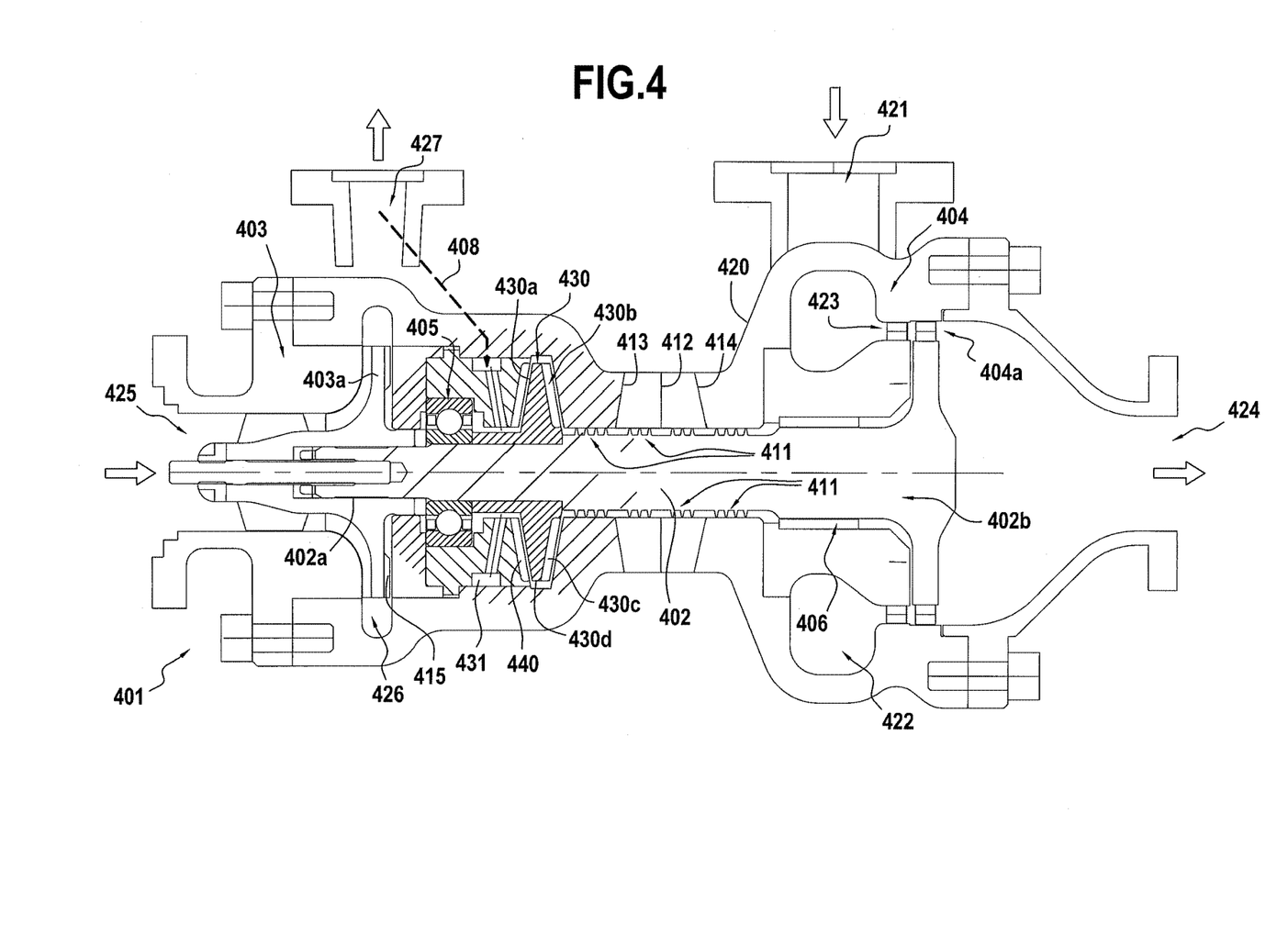
FIG. 4 is a section view of a turbopump in a second embodiment for feeding a rocket engine combustion chamber with liquid cryogenic oxidizer propellant.

In a second embodiment, shown in FIG. 4, the turbopump 401 is an oxidizer propellant turbopump, and more specifically it may be a cryogenic turbopump for a liquid oxidizer. Like the above-described turbopump, it likewise comprises a centrifugal pump 403 and an axial turbine 404 having a common casing 420 and a common rotary shaft 402 connecting together the impeller 403a of the centrifugal pump 403 and the wheel 404a of the axial turbine 404. A first end 402a of the shaft 402 is secured to the impeller 403a, and a second end 402b of the shaft 402, opposite from said first end 402a, is secured to the wheel 404a. The impeller 403a presents a diameter $d_r$.

The casing 420 likewise presents around the turbine 404, a radial admission duct 421, an admission torus 422, a nozzle 423, and an axial exhaust duct 424, and around the pump 403, an axial admission passage 425, a volute 426, and an exhaust tube 427.

As in the above-described examples, the shaft 402 is supported in the casing 420 by a first bearing 405, which is a ball bearing, and a second bearing 406, which is a hydrodynamic bearing in which a thin stream of propulsion gas for the turbine 404 and taken from its admission torus 422, serves to prevent direct contact between facing solid surfaces. Nevertheless, as an alternative, other types of bearing could be envisaged for one or both of the bearings. The first bearing 405 is closer to the impeller 403a of the pump 403, while the second bearing 406 is closer to the wheel 404a of the turbine 404.

Although, in the embodiment shown, the gas for the hydrodynamic bearing 406 is taken from the admission torus 422, in an alternative it could be taken from elsewhere, for example if the temperature of the propulsion gas for the turbine is too high, it could be taken from the outlet of a regenerative circuit of a thrust chamber.

In this second embodiment, the use of a hydrodynamic bearing presents the same advantages as in the first embodiment. As in the prior art turbopump 201 shown in FIG. 2, it is nevertheless important in this oxidizer fluid turbopump 401 to provide very good sealing between the gas of the hydrodynamic bearing 406 and the oxidizer fluid pumped by the pump 403, since the gas of the hydrodynamic bearing is normally a combustion gas rich in reducer or even reducer propellant vaporized at the outlet from the regenerative circuit of a thrust chamber.

In order to obtain this greater sealing, the turbopump 401 includes between the ball bearing 405 and the hydrodynamic bearing 406, not only dynamic seals 411 around the shaft 402, but also an injection point 412 for injecting an inert fluid, such as helium for example, and respective purge points 413 and 414 for purging oxidizer fluid and reducer gas on respective sides of the injection point 412. In this way, a fluid barrier is created between the oxidizer fluid and the reducer gas.

As in the first embodiment, the pump 401 also includes between the dynamic seals 411 and the first bearing 405 a disk 430 that is secured to the rotary shaft 402 in order to compensate the axial forces exerted by the impeller 403a of the pump and the wheel 404a of the turbine on the rotary shaft 402. Thus, the disk 430 presents a substantially smooth front face 430a facing the first bearing 405, and a rear face 430b facing the dynamic seals 411 that presents radial fins 430c. The periphery 430d of this disk 430 has a diameter $d_d$ that may for example lie in the range 70% to 100% of the diameter $d_r$ of the impeller 403a. As in the first embodiment, the thickness of the disk 430 tapers towards its periphery 430d, the front and rear faces 430a and 430b being substantially frustoconical in shape.

The casing 420 presents a passage 431 connected to the exhaust tube 427 and opening out between the first bearing 405 and the front face 430a of the disk 430. In addition, the casing 420 also presents substantially radial fins 440 facing the front face 430a of the disk 430, which fins serve to prevent the fluid injected through the passage 431 from rotating together with the front face 430a of the disk 430. Because of the greater density of liquid oxygen, driving it in rotation leads to a significantly greater increase in the static pressure, against the front face 430a, radially towards the periphery 430d of the disk 430 against the front face 430a of the disk 430, thereby significantly reducing the overall efficiency of the disk 430 in compensating the axial forces on the shaft 402. Specifically, as a result of this rise in static pressure, the fluid reaches the seals 411 at a higher static pressure. Unfortunately, in order to limit the leakage rate through these seals 411, it is appropriate to limit this static pressure, in particular for the purpose of enhancing vaporization of the fluid upstream from the seals 411.

In operation, a flow 408 of liquid propellant under pressure is thus taken from the exhaust tube 427 and is reinjected between the first bearing 405 and the front face 430a of the disk 430. As in the first embodiment, a fraction of this flow 408 serves to lubricate the first bearing 405 and it is then discharged to the volute 426 by a backpump 415 comprising blades formed on a rear face of the impeller 403a of the pump 403. The remainder of the flow 408 flows around the disk 430. Against its front face 430a, the fluid exerts a considerable amount of pressure towards the turbine 404, with the static fins 440 impeding it being entrained in rotation by the disk 430. Nevertheless, over the rear face 430b, the rotation of the fins 430c significantly reduces the pressure exerted by the fluid in the opposite direction. Thus, the pressure difference between the two faces 430a and 430b urges the disk 430 towards the turbine 404, thereby compensating at least in part the traction that is exerted by the impeller 403a on the shaft 402. After passing around the disk 430, this fluid is sucked towards the purge point 413, in the proximity of which its pressure drops below its vaporization point, thereby producing vapor lock that reinforces the sealing between the pump 403 and the turbine 404.

The disk 430 thus contributes simultaneously to compensating the axial forces on the shaft 402 and to providing sealing between the pump 403 and the turbine 404.

Figure 5:
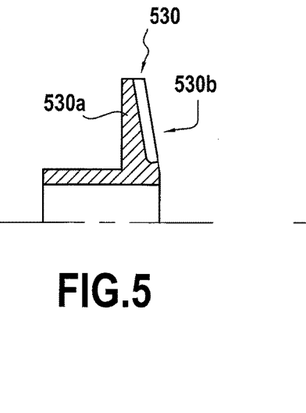
FIGS. 5, 6, and 7 are axial section views of variant axial force compensation disks of the turbopumps of FIGS. 3 and 4.
Figure 6:
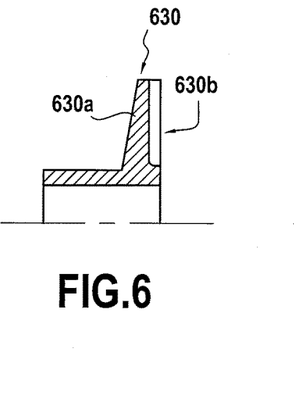
Figure 7:
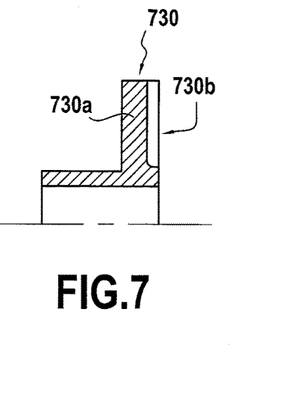

Although the disks 330, 430 for compensating axial forces in the turbopumps 301 and 401 present front and rear faces 330a, 430a and 330b, 430b that are substantially frustoconical, in an alternative at least one of these faces could be straight. Thus, in the disk 530 in the variant shown in FIG. 5, the front face 530a is straight, and only the rear face 530b slopes. In contrast, in the disk 630 in the variant shown in FIG. 7, the front face 630a is straight and only the rear face 630b slopes. Finally, the disk 730 shown in FIG. 7, has front and rear faces 730a, 730b that are both straight, so it presents thickness that is constant. Each of these disks presents a front face that is smooth and a rear face with radial fins, and can be used as a replacement for the disks 330, 430 in the turbopumps 301, 401.

Figure 8:
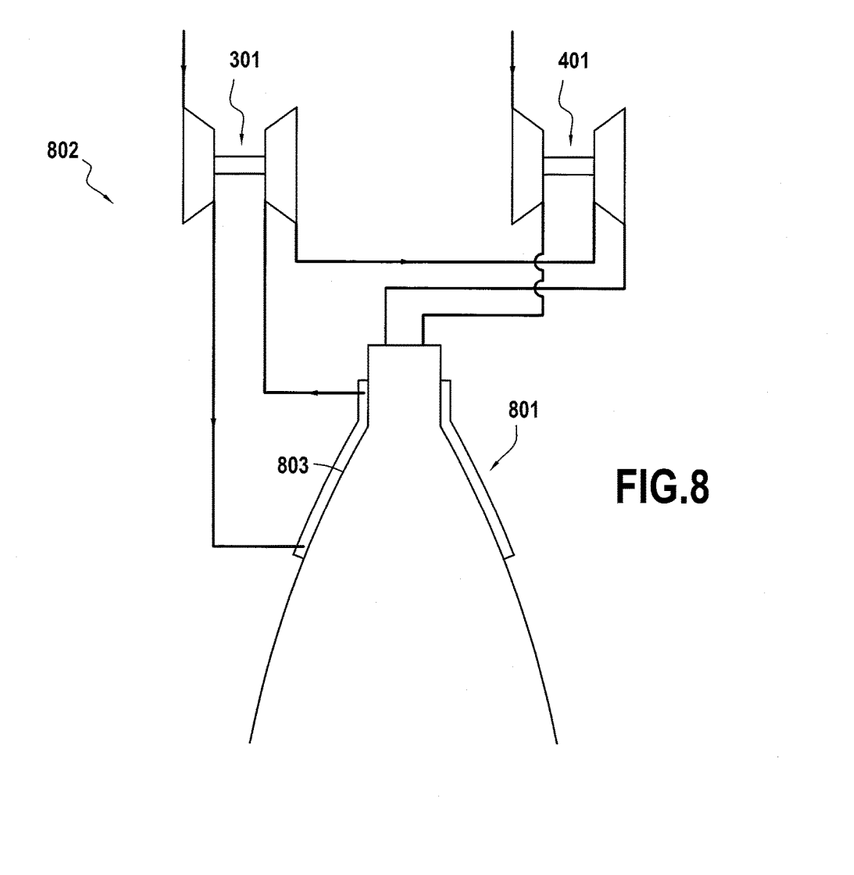
FIG. 8 is a diagrammatic view of a rocket engine with the turbopumps of FIGS. 3 and 4.

The turbopumps 301 and 401 may be used in particular for feeding propellants to a thrust chamber 801 of a rocket engine 802, as shown in FIG. 8. They are particularly adapted for feeding low-thrust rocket engines. The rocket engine 802 is an expansion cycle rocket engine in which the turbines 304, 404 of the turbopumps 301, 401 are driven by hydrogen that has been vaporized on passing through a regenerative heat exchanger 803 around the thrust chamber 801. Nevertheless, other types of rocket engine may be fed by such turbopumps, including rocket engines in which the turbines are driven by combustion gas generated in a gas generator.

Although the present invention is described with reference to specific embodiments, it is clear that various modifications and changes may be undertaken on those embodiments without going beyond the general ambit of the invention as defined by the claims. In particular, although the present invention is described with reference to turbopumps, and more specifically to axial turbine turbopumps, it is equally applicable to other types of pumps actuated by means other than an axial turbine. Characteristics of the various embodiments may also be combined with one another. Consequently, the description and the drawings should be considered in a sense that is illustrative rather than restrictive.

The invention claimed is:

1. A centrifugal pump comprising at least:
   an impeller;
   a rotary shaft secured to said impeller;
   a casing having an axial admission passage;
   at least one first bearing supporting said rotary shaft in said casing;
   at least one dynamic seal around the rotary shaft, said impeller being situated between the dynamic seal and the axial admission passage of the pump; and
   an axial force compensation disk, located between the impeller and at least one dynamic seal, secured to the shaft and presenting a diameter greater than 70% of a diameter of the impeller, with a front face facing towards the impeller and connected to a branch connection for fluid under pressure taken downstream from the impeller, and a rear face facing towards at least one dynamic seal and presenting fins that are oriented radially, at least in part;
   wherein said first bearing is situated between the impeller and the axial force compensation disk.

2. The centrifugal pump according to claim 1, wherein said axial force compensation disk presents thickness that tapers towards a periphery of the disk.

3. The centrifugal pump according to claim 1, wherein said first bearing is also connected to a branch connection for fluid under pressure taken downstream from the impeller for lubricating the first bearing with the fluid coming from the pump.

4. The centrifugal pump according to claim 1, further comprising, facing the front face of the axial force compensation disk, fins that are secured to the casing and that have an orientation that is radial, at least in part.

5. The centrifugal pump according to claim 1, configured to pump a cryogenic fluid.

6. The centrifugal pump according to claim 1, configured to pump a propellant.

7. A turbopump comprising the centrifugal pump according to claim 1 and a turbine with a turbine wheel secured to the rotary shaft of the centrifugal pump, at least one dynamic seal being interposed between the axial force compensation disk and said turbine wheel.

8. The turbopump according to claim 7, wherein said turbine is an axial turbine.

9. A rocket engine including at least one thrust chamber and at least one centrifugal pump according to claim 1 for feeding said at least one thrust chamber with at least one propellant.

* * * * *